Oct. 9, 1962 EKIJU GOMI 3,057,323
BAR CHARTS AND GRAPH BOARDS
Filed July 28, 1960
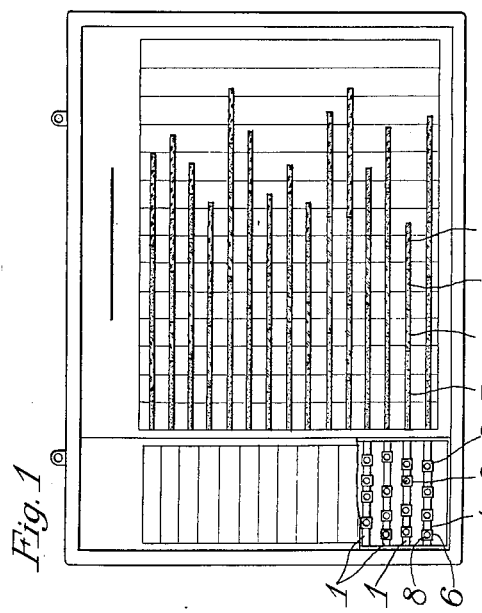
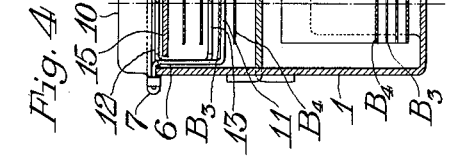
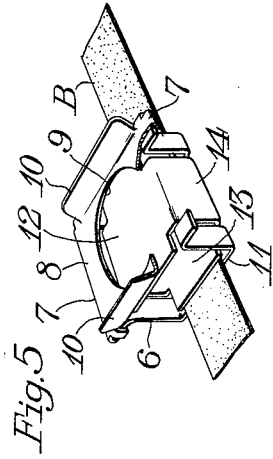
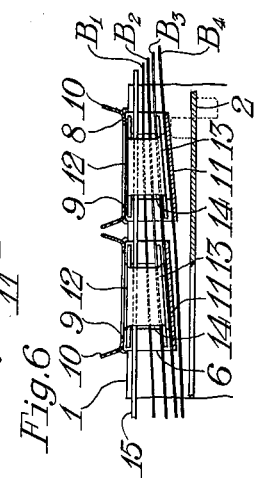
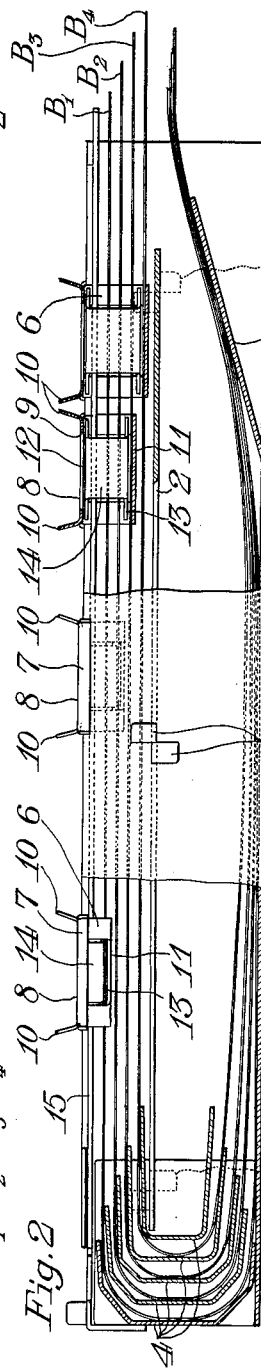
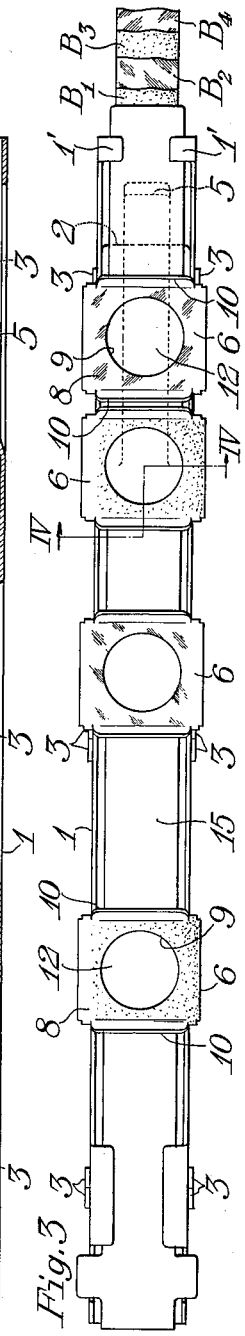

3,057,323
BAR CHARTS AND GRAPH BOARDS
Ekiju Gomi, 1836 Tabata-cho, Kita-ku, Tokyo, Japan
Filed July 28, 1960, Ser. No. 45,868
Claims priority, application Japan July 31, 1959
4 Claims. (Cl. 116—135)

This invention relates generally to bar charts or graphs and more particularly to a device for selectively moving indicator strips forming a line of records in a graph-board.

A principal object of the present invention is to provide a device for individually moving any one of a plurality of indicator strips in graph-board, without interfering with any other indicator in the same line of the graph.

Another object is to provide a device which is simple in construction, economical to manufacture, which can be readily assembled, and is reliable in operation.

A feature of the invention is the provision of a device for a graphboard of the bar chart type. The device comprises means defining an elongated trough in which are disposed a plurality of elongated strip indicators having the form of endless belts and disposed with the runs thereof overlying one another and displaceable longitudinally therein individually selectively. A plurality of carriages are disposed serially on the edges of the trough for traveling thereon in two opposite directions and operable to move respective ones of said indicators longitudinally individually toward or away from a preselected viewing position in which at least one of said indicators is viewed extending longitudinally on the graphboard. The indicators have indicia, for example, a given color, representative of information to be displayed on the graphboard. Each of the carriages is provided with a bottom plate underlying at least one of the strip indicators and has gripper means comprising a presser plate disposed spaced from the bottom plate for allowing selective relative movement between carriage and the indicator. The gripper means is made as a depressible member for selectively depressing the presser plate to an operative position gripping the indicator to be moved by it between said presser plate and said bottom plate. Each carriage comprises means for moving the carriage in opposite directions while the presser plate is in the above-mentioned operative position thereby to move the indicator relative to said viewing position in dependence upon the direction of travel of the carriage.

The accompanying drawing will serve to illustrate specific embodiments of my invention, in order that its utility and functioning will be thoroughly appreciated. It will be understood, however, that these are by way of illustration only and are not to be taken as limiting the invention in any way. In the drawing:

FIGURE 1 is a front perspective view of a graph-board equipped with a plurality of units according to this invention;

FIGURE 2 is an enlarged longitudinal sectional view of one of the propelling units;

FIGURE 3 is a top plan view thereof;

FIGURE 4 is an enlarged cross sectional view taken along line IV—IV of FIGURE 3;

FIGURE 5 is a perspective view partly in section of a carriage; and

FIGURE 6 shows a view of a modified form of two carriages in section.

Referring now to the drawing, the graph-board comprises a plurality of bar chart units. Each unit is provided with a plurality of indicator belts or elongated strip indicators which are disposed overlying one another and since they have in the examples illustrated the form of endless belts they are coaxial so that the respective runs thereof overlie each other. In the drawing, four differently colored strip indicators $B_1$, $B_2$, $B_3$ and $B_4$ are shown for example. As shown in FIGURES 2 to 5, each unit comprises a trough 1 made of sheet metal having substantially a square cross section and open at its front end. A horizontal partition wall 2 extends substantially along the length of the trough 1, but does not reach either end of the trough and it is fixed to the side walls of the trough, for example, by means of ears 3 formed on the side edges of the partition wall. These ears protrude outwardly through holes in the side walls and are bent thereon as shown in FIG. 4.

In the rear part of the trough 1 there are disposed a plurality of bent guide plates 4 arranged in spaced relation forming a bent passage between each two adjacent guide plates as shown in FIGURE 2. At the front part of the trough 1, a portion of the bottom plate is cut longitudinally and bent inwardly into the trough forming a tongue 5 which forms an inclined guide rail. The four strip indicators $B_1$, $B_2$, $B_3$, and $B_4$ are made of resilient material, such as a flexible hard plastic. These belts or indicators extend through the upper compartment above the partition wall 2 are bent through the bent passages formed by the guide plates 4, and extend through the lower compartment between the partition wall 2 and the bottom of the trough, as shown in FIGURE 2. A carriage 6 is provided for each indicator strip for moving the individual indicators longitudinally as hereafter described. Each carriage 6 has hanger ears 7 at both side edges and is slidably mounted on the upper edges of the side walls of the trough 1 which act as guide rails for traveling of the carriages 6 in opposite directions. A top plate 8 on each carriage 6 is provided with an opening 9 through which a finger of the operator may be inserted, and is also provided at its front and rear edges with lips 10 engageable with the operator's finger in moving a carriage. Each carriage has a bottom plate 11. In the carriages 6 there is a grip frame 14 comprising a top plate 12, side walls and a bottom plate 13, and openings at the front and rear ends. The grip frame 14 has a height less than the distance between the top plate 8 and the bottom plate 11 of each of the carriages 6, and is adapted to be freely moved vertically for a limited extent in the respective carriage 6, but is prevented from any horizontal movement relative to the carriage 6.

As shown in FIGURES 4 and 5, one indicator belt is passed between the bottom plate 13 of the grip frame 14 and the bottom plate 11 of the trough 1. It will be seen that by manually applying pressure by means of a finger upon the top plate 12 of the grip frame 14 through the opening 9 in the carriage the indicator belt in a given carriage may be firmly gripped between the bottom plate 13 of the frame 14 and the bottom plate 11 of the carriage. In the example illustrated in the drawing there are four belt carriages 6, each cooperative with a respective one of the superposed four belts or strip indicators B, and these four carriages have different dimensions in height as shown in FIGURE 2. The top of each carriage 6 is preferably colored similar to the color of the belt pertaining thereto for the purpose of identification. A top cover 15 made of flexible sheet is preferably provided.

The operation of the invention is as follows:

When it is desired to move a selected one of the indicator belts, for instance the first belt $B_1$, the first carriage 6 is slid forwardly (to the right in FIGURES 2 and 3) while manually applying pressure upon the grip frame 14 by means of a finger, whereby the upper run of the first belt $B_1$ is gripped between the bottom plate 13 of the frame 14 and the bottom plate 11 of the carriage 6, so that the belt is moved longitudinally and forwardly. The remaining three carriages 6 may be freely moved back and forth according to the backward and forward movement of the operative carriage pertaining to the belt $B_1$.

The latter carriage may be moved until the foremost carriage reaches stops 1' provided at the forward end of the trough 1. When the first carriage reaches the end of its stroke, if farther longitudinal movement of the selected belt is necessary, the first carriage 6 is returned to the retracted position after releasing the gripping pressure upon the belt, so that the carriage may be again pushed forwardly to the desired position, with the belt gripped. This operation may be repeated until the desired length of the bar graph line denoted by the belt is obtained. This operation may be effected with respect to the carriage for any selected belt, keeping all the remaining carriages freely slidable and ineffective upon respective belts. It will be understood that the retraction of the belt may likewise be readily effected by reversing the above described operation. It will also be understood that the forward movement of the visible upper run of a belt results in the rearward retractive movement of the invisible lower run of the belt.

With respect to each of the second and subsequent belt carriages 6 allotted respectively to the belts $B_2$, $B_3$ and $B_4$, the gripping passage between the bottom plate 13 of the grip frame 14 and the bottom plate 11 of the carriage should be located at a lower level than that of the preceding carriage, leaving thereabove a space freely receiving the preceding belts $B_1$, or $B_1$ and $B_2$, or $B_1$, $B_2$ and $B_3$, respectively, so that the four carriages should have different dimensions in height as shown in FIGURE 2. The carriages shown in FIGURE 6 have been designed for the purpose of removing the disadvantage that the plurality of carriages have to be made in different sizes. In this embodiment too, the grip frame 14 must have enough space between the top plate 12 and the bottom plate 13 adapted to accommodate all belts. This modified construction may be distinguished from that shown in FIGURES 2 to 5 in that the bottom plate 11 of the carriage and the bottom plate 13 of the grip frame 14 parallel thereto are inclined upwardly toward the forward end. By such construction, even with respect to a plurality of carriages of the same size, the forward end of the grip passage between the bottom plates 13 and 14 of one carriage is offset from the rear end of the similar grip passage of the adjacent carriage, so that two adjacent belts, for instance belts $B_3$ and $B_4$, may separately be passed through the grip passages in two carriages without interfering with each other when the two carriages come into close proximity as shown in FIGURE 6.

From the foregoing description, it will be seen that the present invention accomplishes a new and advantageous result in an extremely simple, practical and economical manner.

What I claim:

1. A device for a graphboard of the bar chart type comprising means defining, an elongated trough, a plurality of elongated strip indicators disposed overlying one another in said trough and displaceable longitudinally therein individually selectively, a plurality of carriages disposed serially on said means defining said trough for traveling thereon in two opposite directions to move respective ones of said indicators longitudinally individually toward or away from a preselected viewing position in which at least one of said indicators is viewed extending longitudinally on said graphboard, said indicators having indicia representative of information to be displayed on said graphboard, each of said carriages having a bottom plate underlying at least one of said strip indicators and having a gripper means comprising a presser plate disposed spaced from said bottom plate for allowing selective relative movement between carriage and said one indicator, said gripper means comprising a depressible member for selectively depressing said presser plate to an operative position gripping said one indicator between said presser plate and said bottom plate, said carriage comprising means for moving said carriage in said opposite directions while said presser plate is in said operative position thereby to move said one indicator relative to said viewing position in dependence upon the direction of travel of said carriage.

2. A device for a graphboard of the bar chart type comprising means defining, an elongated trough, a plurality of elongated strip indicators disposed overlying one another in said trough and displaceable longitudinally therein individually selectively, a plurality of carriages disposed serially on said means defining said trough for traveling thereon in two opposite directions to move respective ones of said indicators longitudinally individually toward or away from a preselected viewing position in which at least one of said indicators is viewed extending longitudinally on said graphboard, said indicators having indicia representative of information to be displayed on said graphboard, each of said carriages having a bottom plate underlying a respective strip indicator and having a gripper means comprising a presser plate disposed spaced from said bottom plate for allowing selective relative movement between carriage and said respective indicator, said gripper means comprising a depressible member for selectively depressing said presser plate to an operative position gripping said respective indicator between said presser plate and said bottom plate, said carriage comprising means for moving said carriage in said opposite directions while said presser plate is in said operative position thereby to move said respective indicator relative to said viewing position in dependence upon the direction of travel of said carriage.

3. A device for a graphboard of the bar chart type comprising means defining an elongated trough, a plurality of elongated strip indicators disposed overlying one another in said trough and displaceable longitudinally therein individually selectively, a plurality of carriages disposed serially on said means defining said trough for traveling thereon in two opposite directions to move respective ones of said indicators longitudinally individually toward or away from a preselected viewing position in which at least one of said indicators is viewed extending longitudinally on said graphboard, said indicators having indicia representative of information to be displayed on said graphboard, each of carriages having a bottom plate underlying at least one of said strip indicators and having a gripper means comprising a presser plate disposed spaced from said bottom plate for allowing selective relative movement between carriage and said one indicator, said gripper means comprising a depressible member for selectively depressing said presser plate to an operative position gripping said one indicator between said presser plate and said bottom plate, said carriage comprising means for moving said carriage in said opposite directions while said presser plate is in said operative position thereby to move said one indicator relative to said viewing position in dependence upon the direction of travel of said carriage, and the bottom plate of each of said carriages being disposed at a different level corresponding to the level of the respective strip moved by it.

4. A device for a graphboard of the bar chart type comprising means defining an elongated trough, a plurality of elongated strip indicators disposed overlying one another in said trough and displaceable longitudinally therein individually selectively, a plurality of carriages disposed serially on said means defining said trough for traveling thereon in two opposite directions to move respective ones of said indicators longitudinally individually toward or away from a preselected viewing position in which at least one of said indicators is viewed extending longitudinally on said graphboard, said indicators having indicia representative of information to be displayed on said graphboard, each of said carriages having a bottom plate tilted toward the rear underlying at least one of said strip indicators and having a gripper means comprising a presser plate disposed spaced from said bottom plate for allowing selective relative movement between carriage and said one indicator, said gripper means comprising a depressible member for selectively depressing said presser plate and an operative position gripping said one indicator between said presser plate and said bottom plate, said carriage comprising means for moving said carriage in said opposite directions while said presser plate is in said operative position thereby to move said one indicator relative to said viewing position in dependence upon the direction of travel of said carriage.

References Cited in the file of this patent

UNITED STATES PATENTS

| | | |
|---|---|---|
| 1,558,920 | Rech | Oct. 27, 1925 |
| 2,780,202 | Sanderson | Feb. 5, 1957 |
| 2,865,591 | Holinshead | Dec. 23, 1958 |

FOREIGN PATENTS

| | | |
|---|---|---|
| 10,706 | Great Britain | Mar. 7, 1912 |